US007881160B2

(12) United States Patent
Rouquette

(10) Patent No.: US 7,881,160 B2
(45) Date of Patent: Feb. 1, 2011

(54) SEISMIC VIBRATOR ARRAY AND METHODS OF OPERATION

(75) Inventor: Robert E. Rouquette, Kenner, LA (US)

(73) Assignee: ION Geophysical Corporation, Houston, TX (US)

( * ) Notice: Subject to any disclaimer, the term of this patent is extended or adjusted under 35 U.S.C. 154(b) by 20 days.

(21) Appl. No.: 12/098,147

(22) Filed: Apr. 4, 2008

(65) Prior Publication Data

US 2009/0251994 A1 Oct. 8, 2009

(51) Int. Cl.
*G01V 1/155* (2006.01)
(52) U.S. Cl. ...................................................... 367/189
(58) Field of Classification Search .................. 367/38, 367/41, 189; 702/14, 17; 181/106
See application file for complete search history.

(56) References Cited

U.S. PATENT DOCUMENTS

| | | | | |
|---|---|---|---|---|
| 4,168,485 | A | * | 9/1979 | Payton et al. .................. 367/41 |
| 4,607,353 | A | * | 8/1986 | Muir ............................ 367/39 |
| 4,680,741 | A | * | 7/1987 | Wales et al. .................. 367/189 |
| 4,715,020 | A | * | 12/1987 | Landrum, Jr. ................. 367/38 |
| 4,823,326 | A | * | 4/1989 | Ward ............................ 367/41 |
| 5,410,517 | A | | 4/1995 | Andersen |
| 6,704,245 | B2 | * | 3/2004 | Becquey ....................... 367/39 |
| 2009/0010103 | A1 | * | 1/2009 | Sallas et al. ................... 367/41 |

OTHER PUBLICATIONS

Julien Meunier, Pascal Nicodeme, and Salvador Rodriguez, "Analysis of the Slip Sweep Technique," SEG Int'l Exposition and Annual Meeting, San Antonio, Texas, 2001.
Julien Meunier and Thomas Bianchi, "Cost-Effective, High-Density Vibroseis Acquisition," SEG/Houston 2005 Annual Meeting, Houston, Texas, pp. 44-48.
Claudio Bagaini, "Overview of Simultaneous Vibroseis Acquisition Methods," SEG/New Orleans 2006 Annual Meeting, New Orleans, Louisiana, pp. 70-74.

* cited by examiner

*Primary Examiner*—Jack Keith
*Assistant Examiner*—Krystine Breier
(74) *Attorney, Agent, or Firm*—James T. Cronvich

(57) ABSTRACT

An arrangement for conducting a seismic survey and methods for operating a vibrator array in a seismic survey. A signal source coupled to an array of vibrators drives the vibrators with a set of signals to generate seismic signals into a survey area. Each of the signals of the set has an autocorrelation function and a cross correlation function with the other signals of the set that decays faster with time than reflections of the seismic signals from the survey area. One such set of signals includes a linear FM sweep phase-modulated by a maximal-length sequence code shifted a different number of chips for each signal.

18 Claims, 4 Drawing Sheets

SEISMIC VIBRATOR ARRAY AND METHODS OF OPERATION

BACKGROUND

The invention relates generally to seismic prospecting and, more particularly, to arrays of seismic vibrators used to transmit seismic signals during a seismic survey.

In wide-azimuth marine seismic surveying, impulsive seismic sources positioned at spaced-apart geodetic locations surrounding a survey area are fired sequentially at a predetermined shot interval. The interval is determined by the latest expected time of arrival of a reflected seismic signal at hydrophone receivers. Typically, six seismic sources are arranged to define the vertices of a hexagon surrounding the survey area. Because the six sources are fired sequentially, each firing cycle takes six shot intervals to complete.

Various methods have been used to speed up the data acquisition cycle in land seismic surveying. Land seismic surveying uses both impulsive sources and vibrator sources. Vibrator source methods include cascaded sweeps, slip-sweep, and simultaneous shooting. All these methods try to minimize the total time it takes the vibrators to transmit and the reflected signals to arrive at the listening geophones in each cycle by partly or completely overlapping the transmissions of separate vibrators or using one listening period for receiving the reflections of more than one vibrator signal. But all these methods leave room for further shortening of the cycle time for an array of vibrators.

Because of the great expense associated with conducting a land or marine seismic survey, any improvement in productivity, such as shortening the cycle time, is valuable. Thus, there is a need for improving the productivity of seismic surveys.

SUMMARY

This need and other needs are satisfied by a method of operating a seismic vibrator array embodying features of the invention. The method comprises simultaneously driving the vibrators in the array of multiple seismic vibrators with a set of signals having certain characteristics. Each vibrator is driven with a different one of the signals and transmits a corresponding seismic signal. The autocorrelation of any one of the signals and the cross correlation of any one of the signals and any other of the signals decay in amplitude faster with time than reflections of the corresponding seismic signals from a survey area.

In another aspect of the invention, a method of operating a seismic vibrator array comprises driving the vibrators in the array with a frequency-swept signal modulated by a maximal-length sequence code that is chip-shifted a different number of code chips for each vibrator.

In yet another aspect of the invention, an arrangement for conducting a seismic survey of a survey area comprises an array of seismic vibrators and at least one signal source coupled to the vibrators. The signal source provides a set of vibrator signals to drive the vibrators to transmit corresponding seismic signals. The autocorrelation of one of the vibrator signals and the cross correlation of any two of the vibrator signals decay faster with time than reflections of the corresponding seismic signals from the survey area.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
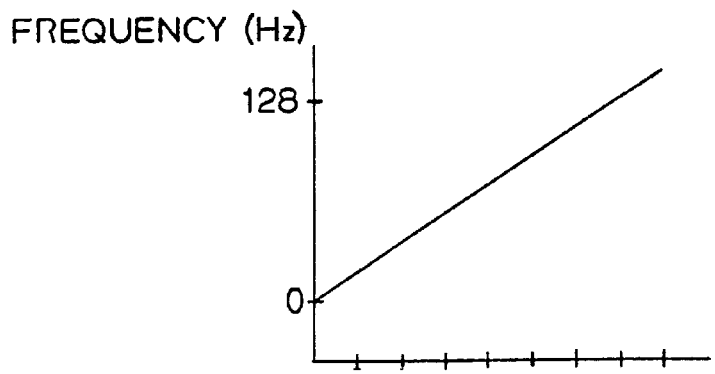
FIG. 1 is a frequency-versus-time graph of an upswept-frequency signal commonly used to drive seismic vibrators and used in the invention.
Figure 2:
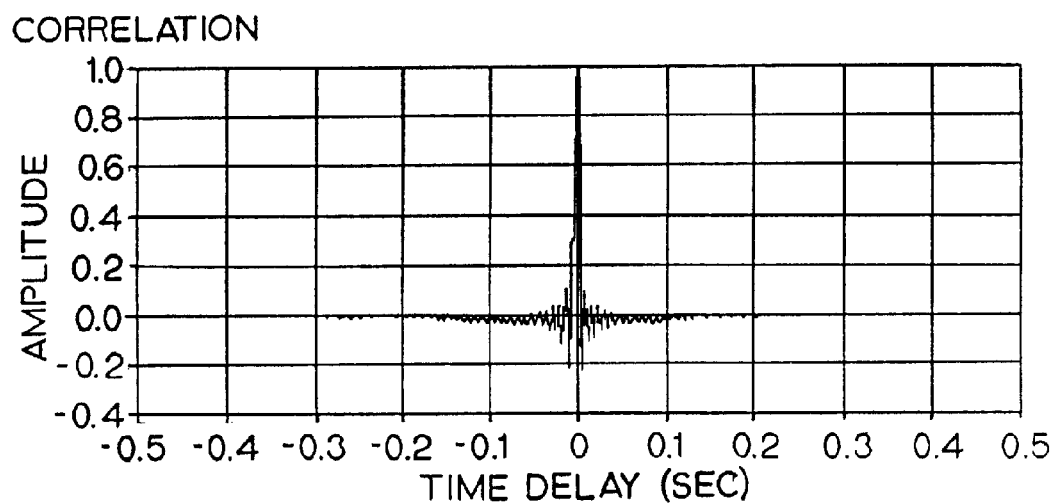
FIG. 2 is a graph of the autocorrelation function of the signal depicted in FIG. 1.

A conventional drive signal for a seismic vibrator is a linear frequency upsweep, for example, from 0 Hz to 128 Hz, as described in FIG. 1. The signal has a duration of 8.192 s. Its amplitude is constant, except for a 5% of duration raised-cosine amplitude taper at the beginning and end. The autocorrelation function of this linear swept-frequency signal has the well-known thumbtack shape shown in FIG. 2. The narrow thumbtack autocorrelation function makes this a good signal to use with a correlation receiver when accurate measurements of the reception times of reflected signals are needed. It's also clear from FIG. 2 that the autocorrelation function of the linear frequency upsweep signal decays faster with time than the reflected seismic signals are attenuated with time. With a duration of about 8 s and a bandwidth of about 125 Hz, the linear upsweep signal has a time-bandwidth product TW of about 1000, or a process gain of about 30 dB.

Figure 7:
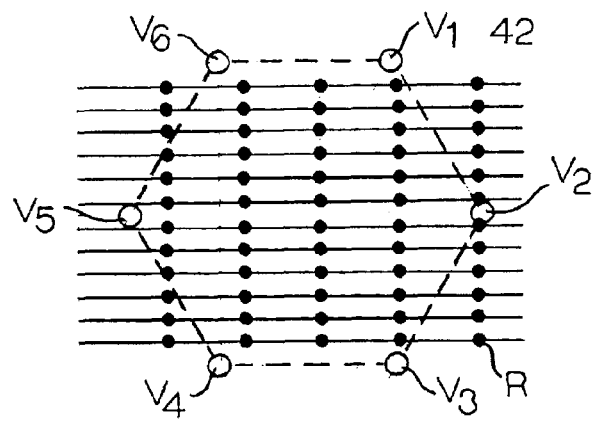
FIG. 7 is a top plan view of a typical wide-azimuth marine survey layout.

In a wide-azimuth survey, as shown in FIG. 7, in which six vibrators $V_1$-$V_6$ are arranged in a hexagonal pattern, the time it takes to transmit seismic signals from each of the vibrators and to detect them unambiguously in hydrophone or geophone receivers R is the cycle time of the system. If each of the vibrators transmits sequentially every shot interval, it takes six shot intervals before the cycle can be repeated. But, if each vibrator is driven by a different signal on a different channel and the receivers are capable of receiving on the different channels, it would be possible to drive the vibrators simultaneously and shorten the cycle time to one-sixth the time for sequential driving. Signals capable of enabling simultaneous operation of the vibrators must have autocorrelation functions, like that in FIG. 2 for the frequency upsweep signal, that decay faster with time than the seismic reflections. But they must also have cross correlation functions that decay faster with time than the seismic reflections. Furthermore, the signals must each occupy the full bandwidth that the earth will propagate and not exceed the conventional shot interval in duration. These requirements set the signal time-bandwidth product at about 1000, just as for the frequency upsweep signal.

Figure 3:
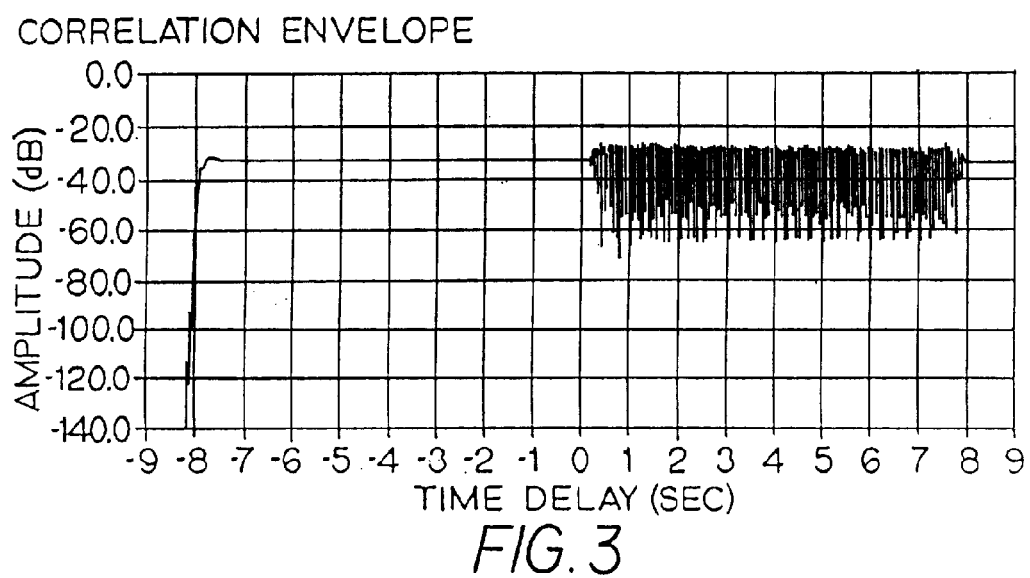
FIG. 3 is a log-amplitude graph of the cross correlation function of the signal of FIG. 1 and of a swept-frequency signal downswept over the same range of frequencies.
Figure 4:
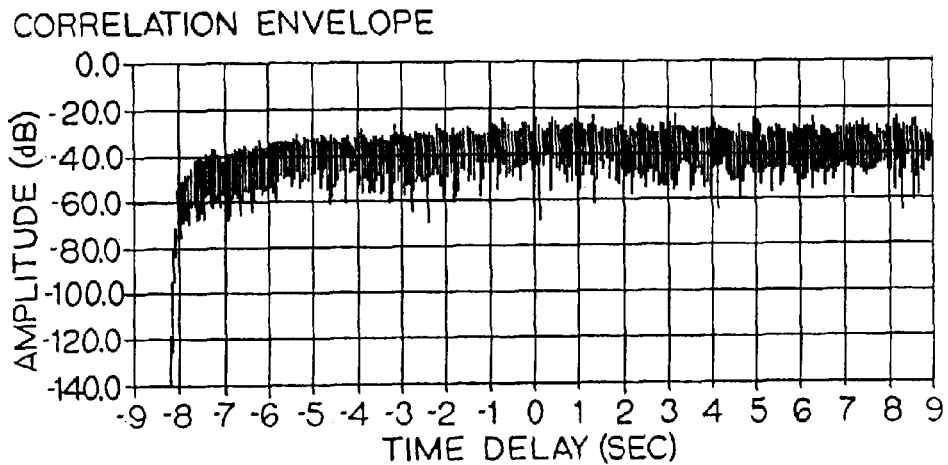
FIG. 4 is a log-amplitude graph of the cross correlation function of two binary-code phase-modulated signals.

Textbook examples of signals with low cross correlation include the pair consisting of the frequency upsweep signal and the corresponding frequency downsweep signal and also the set of binary-code phase-modulated signals. But the cross correlation energy is spread uniformly over the time duration for both the frequency upsweep-downsweep pair and for the binary code phase-modulated signals, as shown by the flat cross correlation characteristics of FIGS. 3 and 4. Because the cross correlation energy is spread uniformly over the time duration, it represents an attenuation equal to the time-bandwidth product, or 30 dB. Signals with that property are not usable in seismic surveys because the −30 dB cross correlation tail would obscure late arriving seismic reflections.

To achieve the requirements for productive surveying, the cross correlation energy must be spread non-uniformly over the time duration. The integral of the cross correlation energy over the time duration is constant and is determined by the time-bandwidth product of the signals. If the cross correlation energy is increased closer to the start time of each shot interval (t=0), the tail of the cross correlation function will be depressed below −30 dB so that reflected seismic signals can be received.

Figure 5A:
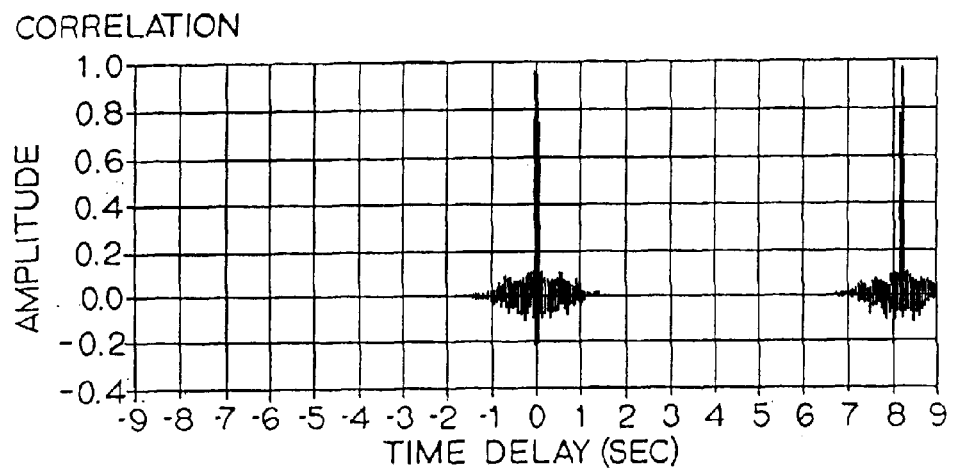
FIG. 5A is a graph of the autocorrelation function of a member of a set of signals having characteristics embodying features of the invention.
Figure 5B:
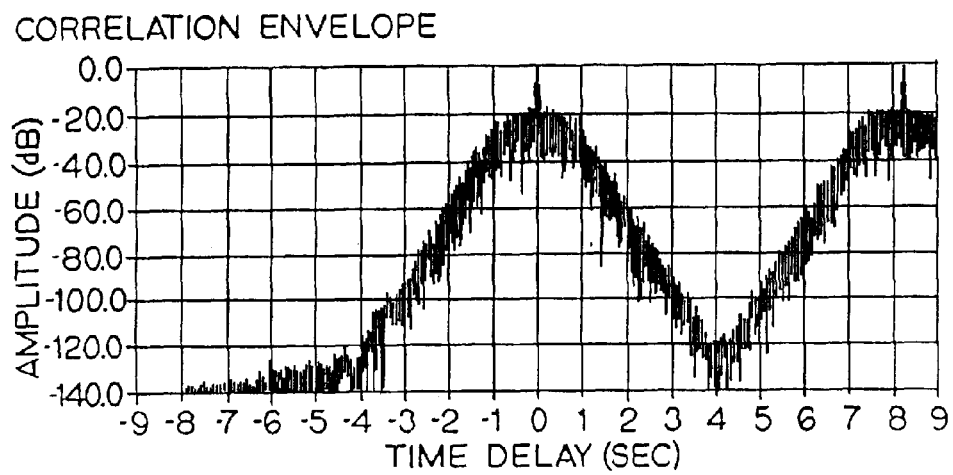
FIG. 5B is a log-amplitude graph of the autocorrelation function of FIG. 5A.

A signal set having a thumbtack auto correlation function, as in FIG. 5A, and a depressed auto correlation tail, as in FIG. 5B, partly meets the requirements for a productive survey. To enable simultaneous vibrator driving, the signal set must also have a cross correlation function over all the signals in the set that exhibits the depressed correlation tail as in the autocorrelation function of FIG. 5B. Although there is some degradation of the signal-to-noise ratio (SNR) close to the autocorrelation peak, this is offset by the depressed tail of the cross correlation function, which allows the detection of seismic reflections that arrive at receivers asynchronously and that decay in strength with time. And, because the modulation is noiselike, the seismic trace SNR can be improved through conventional processing techniques such as trace stacking and fold.

Figure 8:
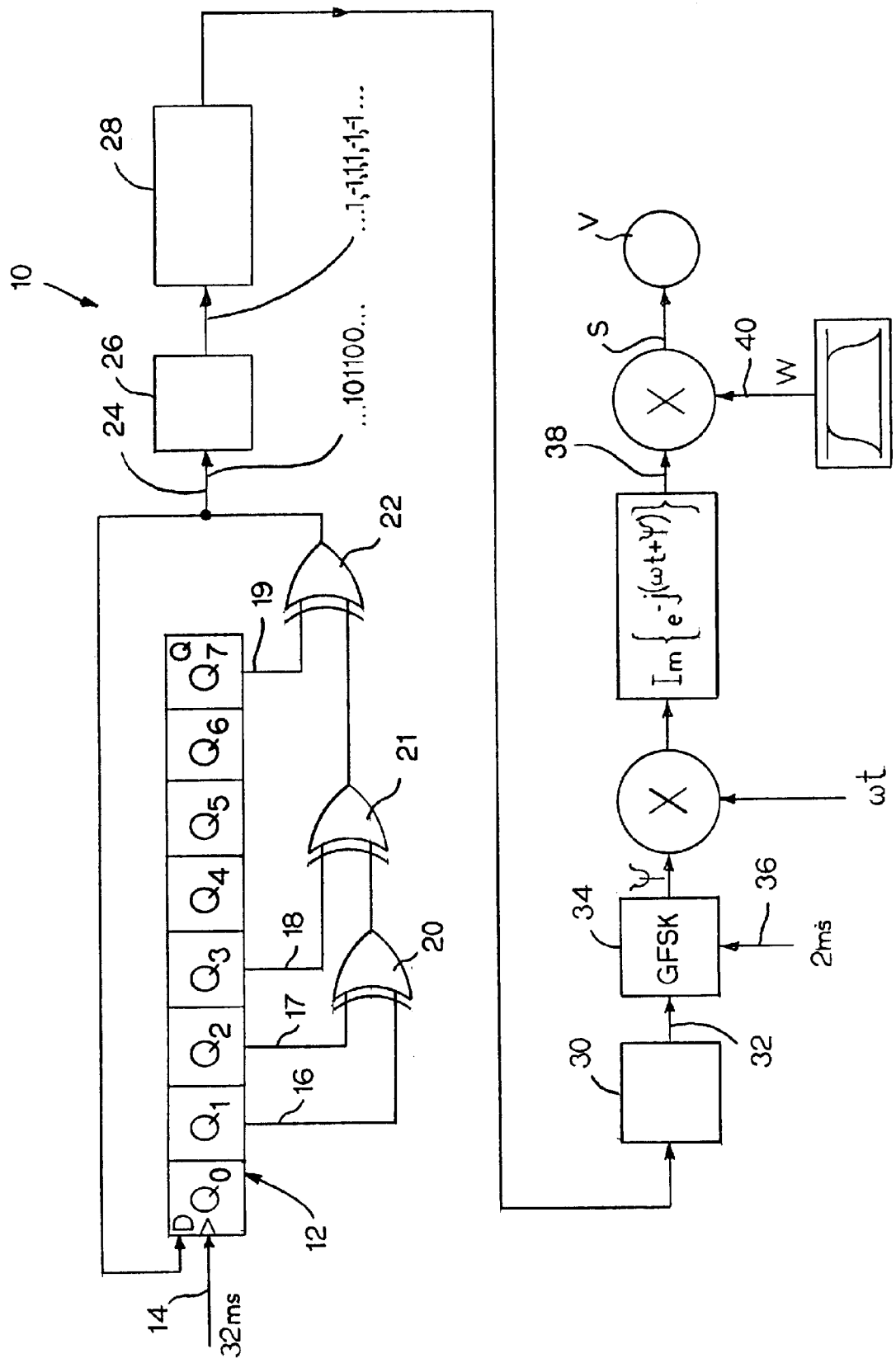
FIG. 8 is a block diagram of an arrangement for conducting a seismic survey according to the invention.

A preferred signal set exhibiting these properties is a set of frequency-swept signals angle-modulated by a pseudo-random noise maximal-length sequence (MLS) code. The frequency-swept signal is preferably a frequency-modulated (FM) sweep from about 0 Hz to about 128 Hz with a duration of about 8.192 s. The signals are generated in a signal source 10, as shown in FIG. 8. The MLS code is generated in a code generator having, in this example, an 8-bit shift register 12 clocked by a 32 ms clock signal 14. Taps 16-19 combine the states of shift register positions $Q_1$, $Q_2$, $Q_3$, and $Q_7$ in exclusive-or gates 20-22 to produce the MLS sequence 24, which is fed back into the D input of the shift register. The 8-bit shift register produces a 255-chip (or -bit) MLS sequence. Each chip has a duration of 32 ms for a total sequence duration of 8.16 s. The MLS sequence of 0's and 1's is mapped into a corresponding sequence of −1's and 1's, as indicated by mapping block 26. The sequence of −1's and 1's is then shifted in a circular shift register 28 by a certain number of code chips. In one example shifting scheme, the code is shifted by the vibrator sequence number multiplied by 2. This would allow up to 127 vibrator signals in the signal set. To increase the duration of the signal to 8.192 ms, a 0 is prepended to the beginning of the mapped MLS sequence in block 30 to produce a 256-chip sequence 32. The sequence is applied to a Gaussian Frequency Shift Keying (GFSK) modulator 34 operated at a 500 Hz sample rate by a 2 ms clock signal 36.

The GFSK modulator smooths the code transitions between −1 and 1 using Gaussian filter techniques to cause the autocorrelation of any one of the signals and the cross correlation of any one of the signals and any other of the signals to decay faster with time than the reflections of the corresponding seismic signals. The Gaussian filter techniques also restrict the spectral extent of the signal to the seismic frequency band. The preferred GFSK modulator operates with modulation index h=0.5 and normalized bandwidth BT=0.25. GFSK having a modulation index h=0.5 is also known as Gaussian Minimum Shift Keying (GMSK). With GMSK the signal phase advances 90 degrees for an input of +1 and the signal phase retards 90 degrees for an input of −1. The phase-modulating signal $\psi(t)$ out of the GFSK modulator further modulates the phase of the linear frequency upsweep signal $\omega(t)$ to produce a vibrator-driving signal 38 ($e^{-j[\omega(t)\cdot t+\psi(t)]}$). Before being applied to a vibrator, the signal's amplitude is shaped by a taper window function w(t) 40 with a 5% of time taper ratio to further attenuate the tails of the signal correlations. Thus, the autocorrelation of any one of the signals and the cross correlation of any one of the signals and any other of the signals decay faster with time than the reflections of the corresponding seismic signals. This also further restricts the spectral extent of the signal to the seismic frequency band. The actual vibrator-driving signal is preferably given by $s(t)=\text{Im}\{w(t)\cdot e^{-j[\omega(t)\cdot t+\psi(t)]}\}$ or also by $s(t)=\text{Re}\{w(t)\cdot e^{-j[\omega(t)\cdot t+\psi(t)]}\}$, where $\omega(t)=2\pi f_1 t+\pi(f_2-f_1)t/T$, T is the signal duration, and $f_1$ and $f_2$ are the start and end frequencies of the sweep, preferably 0 Hz and 128 Hz. The frequency sweep $\omega(t)$ may be any of the linear or non-linear frequency sweeps used in seismic prospecting.

Figure 6A:
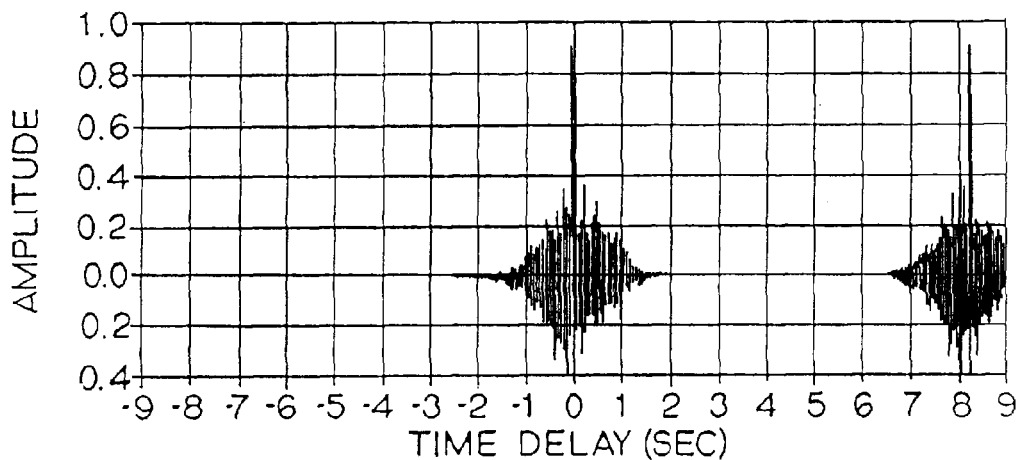
FIG. 6A is a linear graph of the first break response from six vibrators arriving simultaneously at a receiver.
Figure 6B:
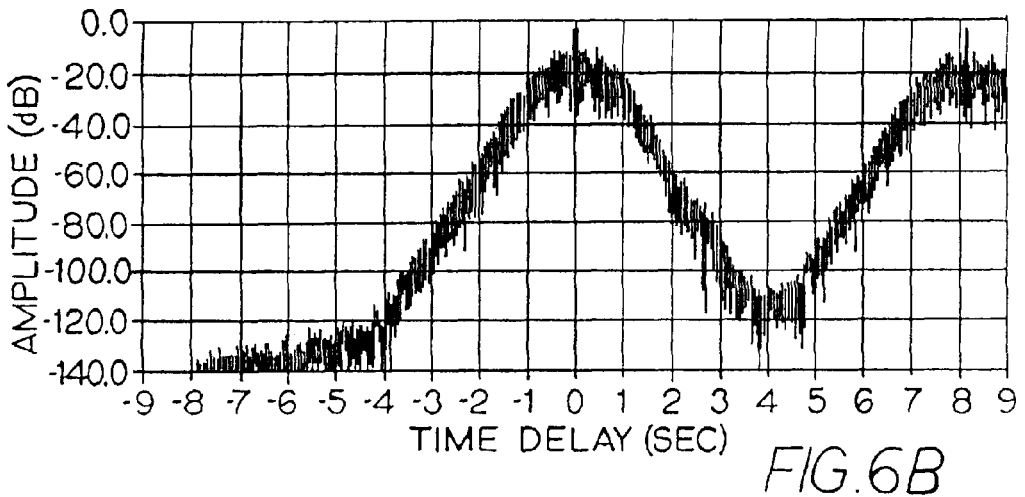
FIG. 6B is a log-amplitude graph of the linear graph of FIG. 6A.

Because the MLS codes, when phase-modulating the swept-frequency signal, produce effectively uncorrelated signals for chip-shifted replicas of the original code, they can be used to form a set of signals that has the desired properties to allow simultaneous operation of multiple vibrators in an array. The first-break response to the signals from six vibrators arriving simultaneously at a receiver on one channel of the receiver is shown in FIGS. 6A and 6B. (Five of the vibrators' signals are off channel; one is on channel.) The SNR close in is almost 8 dB lower than that for a single vibrator as depicted in FIG. 5B because the off-channel pseudo-random noise signals add noise power into the channel.

Thus, each hydrophone or geophone receiver's output is processed in different channels—one corresponding to each vibrator signal. A synchronizing signal, as indicated by dashed lines 42 in FIG. 7, may be sent to each vibrator position in a widely spaced array to ensure simultaneous operation of the vibrator arrangement.

Although the invention has been described in detail with respect to a preferred version, other versions are possible. For example, the term "vibrator" may refer to a single vibrator or a group of generally collocated vibrators operated in a coordinated manner to generate a composite group seismic signal. And the array of vibrators may be collocated instead of arranged widely spaced apart in a hexagonal or other pattern for wide-azimuth applications. Any of the signal parameters, such as start frequency, stop frequency, amplitude taper, number of chips in the MLS code, code chip duration, type of phase or frequency modulation, type of modulation filter, and any other signal parameter, may be changed to suit the needs of a particular seismic survey. Signal sets, other than the MLS code-modulated linear FM signal set described, may be used as well to practice the invention as long as they exhibit the desired correlation characteristics. As another example, a single signal source could be coupled to all the vibrators, or each vibrator could have its own signal source. Furthermore, the signal set is applicable to both land and marine vibrators. So, as these few examples suggest, the claims are not meant to be limited to the preferred versions described in detail.

What is claimed is:

1. A method of operating a seismic vibrator array, comprising:

simultaneously driving the vibrators in an array of multiple seismic vibrators each with a different one of a set of signals to transmit corresponding seismic signals, wherein the set of signals comprises a frequency-swept signal angle-modulated by a filtered maximal-length sequence code chip-shifted a different number of code chips for each vibrator and wherein the autocorrelation energy of any one of the signals and the cross correlation energy of any one of the signals and any other of the signals is spread non-uniformly over time from a first level at the start of a time interval when reflections of the corresponding seismic signals from a survey area are strong to a second level when reflections are weaker, wherein the first level is greater than the flat level of signals having uniformly spread cross correlation energy and the same time-bandwidth product as the set of signals, and wherein the second level is less than the flat level.

2. The method of claim 1 wherein the frequency-swept signal is a linear frequency upsweep.

3. The method of claim 1 wherein the frequency-swept signal is swept from 0 Hz to 128 Hz.

4. The method of claim 1 wherein the maximal-length sequence is 255 chips long.

5. The method of claim 1 wherein the duration of each code chip is 32 ms.

6. The method of claim 1 wherein each chip in the maximal-length sequence code advances or retards the phase of the frequency-swept signal.

7. The method of claim 1 comprising filtering the maximal-length sequence code angle-modulating each of the frequency-swept signals in a Gaussian filter to attenuate the tails of the signal correlations.

8. A method of operating a seismic vibrator array, comprising:

driving the vibrators in a seismic vibrator array with a frequency-swept signal angle-modulated by a maximal-length sequence code chip-shifted a different number of code chips for each vibrator; and filtering the maximal-length sequence code angle-modulating the frequency-swept signal for each vibrator to attenuate the tails of the signal auto- and cross correlations.

9. The method of claim 8 wherein the vibrators are excited simultaneously at generally regular intervals.

10. The method of claim 8 wherein the frequency-swept signal is a linear frequency upsweep.

11. The method of claim 8 wherein the frequency-swept signal is swept from 0 Hz to 128 Hz.

12. The method of claim 8 wherein the maximal-length code sequence is 255 chips long.

13. The method of claim 8 wherein the duration of each code chip is 32 ms.

14. The method of claim 8 further comprising filtering the maximal-length sequence code angle-modulating the frequency-swept signal for each vibrator in a Gaussian filter.

15. The method of claim 8 wherein each chip in the maximal-length sequence code advances or retards the phase of the frequency-swept signal.

16. The method of claim 8 wherein the cross correlation tail of the angle-modulated frequency-swept signal of a first one of the vibrators with the angle-modulated frequency-swept signal of a second one of the vibrators decays faster with time than the reflected angle-modulated frequency-swept signals of the first and second vibrators.

17. An arrangement for conducting a seismic survey of a survey area, comprising:

an array of seismic vibrators;

at least one signal source coupled to the vibrators to provide a set of vibrator signals to drive the vibrators to transmit corresponding seismic signals, wherein the autocorrelation tail of one of the vibrator signals and the cross correlation tail of any two of the vibrator signals decay faster with time than reflections of the corresponding seismic signals from a survey area, the signal source including:

a frequency generator generating a swept-frequency signal;

a code generator generating a maximal-length sequence code to angle-modulate the swept-frequency signal to provide one of the vibrator signals; and a filter filtering the maximal-length sequence code angle-modulating the frequency-swept signal to attenuate the tails of the signal correlations.

18. An arrangement as in claim 17 wherein the vibrators are driven simultaneously at generally regular intervals.

* * * * *